Dec. 16, 1958   F. H. DEILY ET AL   2,864,403
DESURGER FOR LIQUID SYSTEMS
Filed May 10, 1955
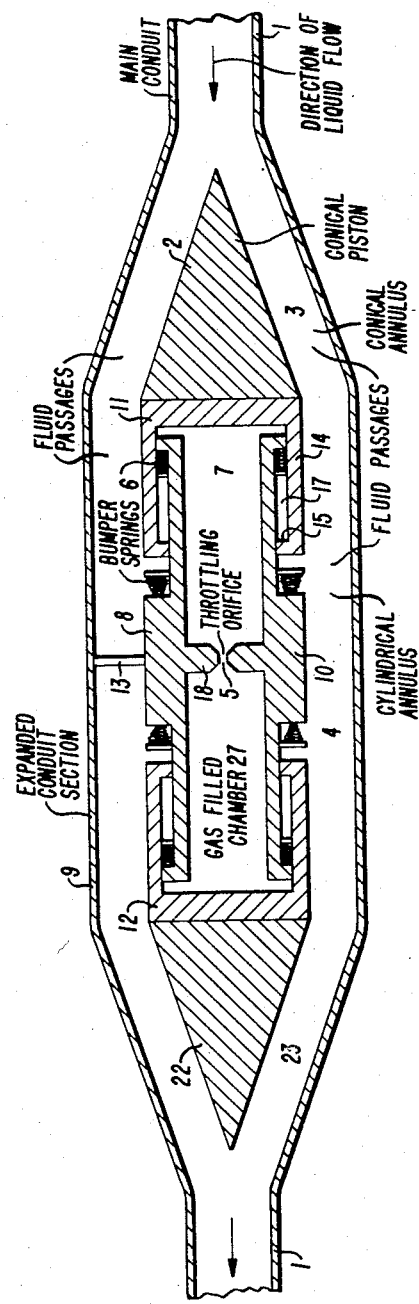
FREDRIC H. DEILY
ERNEST C. FITCH, JR.
INVENTORS
BY J. A. Reilly   ATTORNEY

United States Patent Office 2,864,403
Patented Dec. 16, 1958

2,864,403

DESURGER FOR LIQUID SYSTEMS

Fredric H. Deily, Tulsa, and Ernest C. Fitch, Jr., Stillwater, Okla., assignors, by mesne assignments, to Jersey Production Research Company Application May 10, 1955, Serial No. 507,288

4 Claims. (Cl. 138—26)

The present invention relates to liquid containing systems and particularly to means for eliminating pressure surges within such systems. The invention especially concerns conduits and associated apparatus for transferring liquids and to an apparatus for reducing sudden pressure surges or wave fronts therein. The invention is thus directed toward the reduction and elimination of phenomena in liquid-filled conduits systems which are popularly designated as "water hammers."

The occurrence of sudden pressure surges or wave fronts in liquid transmission systems is well recognized in the art, and a number of devices have been suggested or employed for their elimination or reduction. The surges themselves are generally occasioned by the action of devices such as reciprocating pumps, compressors, etc. which impart pressure shocks to a system; or they may be caused by the sudden closure of valves and the like. Regardless of the cause of their occurrence, however, the surges are extremely undesirable in that they subject a fluid system to severe strains and may actually cause a rupture or breakdown of the system. Thus, it is not entirely uncommon for pipes, tubes, etc. in liquid conduit systems to be shattered or otherwise ruptured by the occurrence of an extreme pressure wave front or surge.

As pointed out above, a number of devices have been suggested or actually employed in the art for the purpose of minimizing pressure surges in fluid-containing systems. One such device is a gas-filled chamber which is conveniently mounted in an elbow or T section of a conduit. The gas within the chamber is trapped there by the liquid which is present in the conduit and is compressed or expanded by the occurrence of any extreme pressure changes in the liquid. While this device is moderately effective in reducing pressure surges, it is not entirely satisfactory since the gas within the chamber is frequently dissolved or entrained away by the liquid flowing through the system. In order to combat this shortcoming gas connection are occasionally installed within the gas chamber, and gas is introduced within the chamber whenever the volume of gas contained there decreases to a predetermined amount. Necessarily, this procedure requires regular maintenance and observation and is therefore not an entirely satisfactory solution to the problem.

Accordingly, it is an object of the present invention to provide an apparatus for eliminating pressure surges in liquid filled systems wherein the apparatus is fully automatic in its operation. It is a further object of the invention to furnish a device which combines the desirable and simultaneous effects of energy absorption, stream divergence, phase change, and velocity reduction on the flowing stream. It is a particular object of the invention to reduce and eliminate the pressure surges and "water hammers" that are known to occur in conduits that are employed for transferring liquids.

These and other apparent objectives are realized in accordance with the invention by the utilization of a cylindrically shaped, conically tipped member which is provided with at least two interconnected chambers that are filled with a compressible fluid. The member further is of a character such that each conical end portion is movable relative to the overall member whereby the fluid in one of said chambers is compressed in response to a pressure surge and forced into another chamber after a suitable time delay. The member is also of an elastic nature in that the conical end portions return to their original end positions relative to the overall device after being exposed to a pressure surge.

In a preferred form, the desurger member is disposed within a conduit section so as to define (1) a cylindrically annular passageway between the central cylindrical portion of the member and the inner surface of the conduit section and (2) a conically annular passageway between each conical tip and the inner surface of the conduit section. Thus, liquid flowing past the member first impinges upon one of the conical tip poritions; and it thereafter flows through the first of the conically annular spaces thereby decreasing in velocity. It then flows through the cylindrically annular space and the second conically annular space thereafter increasing in velocity. The conical tips at the upstream end break up any surge or pressure wave front in the liquid and divert it into the annular passageway. From the annular passageway in which the stream velocity is reduced, the diverted stream flows past the second conical tip, remixes and thereafter flows on its way. The energy in the extreme pressure surge or wave front is diffused and to some extent absorbed by (1) the staggered compressive action in the fluid-filled chambers (2) the combined conico-annular and annular flow path, resulting in a redirection of the stream and a reduction in its velocity (3) the impingement of the annular flow stream upon itself as it mixes within and leaves the desurger device.

In its preferred form the desurger device, as mentioned earlier, is filled with a compressible fluid which is arranged to contract or expand volume-wise in response to pressure changes that occur in the vicinity of the device. Thus, the control body of the device is conveniently filled with a gas such as air, nitrogen, carbon dioxide, etc. in at least two chambers whose volumes are changed by movement of the conically tipped end portions with respect to the main body portion. The body portion is furthermore provided with small fluid passageways through which the gas within the chambers must pass in response to relative movements between the body portion and the end portions. Flow of the gas through these passageways in combination with volume changes in the gas as well as the relative movements between the various parts of the device diffuse the energy of a pressure surge or wave front and thereby dispense with the danger to a fluid conduit system that such a wave front poses.

It will be appreciated that the apparatus of this invention may be employed in any convenient portion of a fluid system, but it is preferably positioned within a conduit portion of the system through which the fluid must flow. Thus, in a system such as one where a pump withdraws a liquid from one tank and forces the liquid through a pipe or tube to a second tank, it is preferred that the present device be positioned within the system at a point between the two tanks, and directly within the pipe or tubing. It is further preferred that the section of pipe or tubing in which the device is installed be of a greater diameter than the main pipe or tubing so as to provide an annular space between the device and the wall of the expanded portion which is two to five times and preferably about three times the cross-sectional area of the main conduit.

The invention may be better understood by reference to the attached drawing wherein the apparatus of the invention is illustrated as it would be employed in a conventional type conduit system for transferring liquids from one place to another. It will be understood that other devices such as pumps, valves, storage vessels, fittings, and the like may be employed with the apparatus that is illustrated in the figure. The use of these items is conventional and well understood in the art, and it is therefore considered unnecessary to include a detailed discussion or illustration of them in this description.

Referring to the figure, there is illustrated a main conduit 1, an expanded conduit section 9, and a desurger device 8 such as constitutes a preferred embodiment of the present invention. The desurger 8 includes a central body member 10 and two end members 11 and 12.

The body member 10 is substantially a hollow cylinder which is open at each end and supported from the interior surface of the expanded conduit section 9 as by means of one or more rod members 13. Each end member includes a conical piston which is secured at its base to a hollow cylindrical base portion. Thus, end member 11 possesses conical piston 2 and base portion 14. Base portion 14 in turn is arranged to move in a sliding fluid-tight relationship with the exterior surface of the body member 10. Thus, cylindrical portion 14 may be provided with a shoulder 15 which extends around the outer surface of the body member 10 and which is in a fluid-tight relationship with respect to the body member. It will be appreciated that mechanical seals, packing glands or equivalent means may be conveniently provided in the space 17 in order to insure the aforementioned fluid-tight condition.

In the figure it will be observed that the body member 10 and each end member 11 and 12 are aligned such that they are centered on a common longitudinal axis. It will further be noted that the integrated apparatus—i. e. the desurger itself—is positioned and supported within the expanded conduit section 9 so as to form conical annuli 3 and 23 and a cylindrical annulus 4 with the inner wall surfaces of the section.

At this point it will be noted that the desurger is preferably positioned within the expanded section 9 in a symmetrical manner both longitudinally and laterally. It will further be noted that the expanded section 9 and body member 10 are of dimensions such that the length of the expanded section is approximately 4 to 15 and preferably 8 times the diameter of the main conduit.

In a preferred form of the invention such as is illustrated in the figure, it is preferred that one or more bumper springs 6 be provided to prevent impact loading at the end-of-travel points for each one of the end members 11 and 12. It is further preferred that the interior of the body member 10 be divided into two longitudinally juxtaposed chambers or cylinders 7 and 27 as by means of a solid wall portion 18. It is additionally preferred that this wall portion be provided with at least one small fluid passageway or orifice 5 which is adapted to provide a throttling type of fluid flow between the two chambers. Each of the chambers should further be filled with a compressible fluid such as a gas or compressible liquid. Preferred fluids for this purpose include the inert gases such as nitrogen, argon, helium and the like. A suitable liquid is mineral oil.

The orifice 5 is of a dimension such that the effect of a fluid compression or expansion in one of the chambers is transmitted to the other chamber after a suitable time delay. Thus, the orifice is sized such that the compressive displacement of one end portion in response to a supernormal pressure surge results in an expansive displacement of the other end portion only after the surge has passed the latter end portion.

Having described the structural features of the apparatus in the attached figure, attention is now directed to a consideration of the manner in which the apparatus operates. For this purpose it will be assumed that liquid is flowing from right to left in the figure as illustrated and that a supernormal pressure surge or wave front has been transmitted through the conduit 1 in the same direction as the flow of the liquid. It will be further assumed that chambers 7 and 27 are filled with nitrogen.

As the surge enters the expanded conduit section 9, it immediately impinges upon the tip of the conical member 2 and is diverted into the annular passageway 3 wherein the fluid travels at a reduced velocity. As the surge is diverted in this manner, it acts upon the surface of the conical piston 2 in a manner so as to drive the piston inwardly against the fluid enclosed within the chamber 7. In so doing, the gas within the chamber 7 in turn is forced through the orifice 5 into the second chamber 27. The resulting combination of the diversion in flow of the pressure surge, the surge phase dissipation, and the compression and throttling flow of the gas within the body member 10 acts to absorb a substantial portion of the energy associated with the pressure wave front. Furthermore, the energy which is not thus absorbed is reimparted to the flowing stream by expansion of chamber 27 but only after the surge has passed. Thus, the effect on the initial surge is one of diffusion.

Having entered the conically annular passageway 3, the diverted pressure surge flows along the cylindrically annular passageway 4 and thereafter along the second conically annular passageway 23. Upon leaving the second conical annulus, the liquid recombines, mixes and continues on its way through the main conduit 1. Upon flowing past the second conical member 22, however, at least a part of the remnant energy within the pressure surge is absorbed by driving this second conical member and its associated cylindrical base 12 against the down-flow end of the body member 10. Once again, gas is compressed within the chamber 27 and is tended to be forced through the orifice 5 into the first gas chamber 7. This action on the part of the conical member 22 and the gas within chamber 27 again acts to absorb and diffuse the energy associated with the initial surge. Additional surge energy is further dissipated and absorbed by the mixing action which occurs downstream from the second conical member 22.

It will be noted that a low pressure surge generally follows immediately in the wake of a high pressure surge, and the apparatus in the figure automatically compensates for this subnormal pressure by a procedure which is substantially opposite but analogous to the procedure just described. In this instance, the conical end members move longitudinally outward with respect to the body member 10 in response to the low pressure wave and thereby supply energy to the moving liquid stream. In short, the desurger device not only compensates for and eliminates both high and low pressure surges, it also serves as a damping device in that it acts somewhat as a pressure regulator and controller.

At this point it is well to note that the time delay occasioned by the passageway 5 is preferably of a value such that the second conical piston moves out after the supernormal portion of the surge has passed but before the subnormal portion has passed.

The foregoing description has been intended to explain and illustrate the basic principles of the invention; but it is not to be considered that the invention is to be limited to this particular embodiment. It will be noted, for example, that a plurality of these devices may be employed in a single fluid system if a plurality of them is desirable or necessary. It will further be appreciated that the device may be constructed from a wide variety of metals and other materials depending upon the particular fluid system in which it is to be employed. It will further be noted that a plurality of throttling passageways such as the orifice 5 may be utilized. Again, springs under tension as well as under compression may be incorporated within the apparatus to assist in its operation.

Still other constructional features which may be incorporated within the illustrated apparatus include configurations wherein the body member is either a piston-like device and the end members 12 are cylinder-like devices or vice versa. Also, the conical members 2 and 22 may be fluted or truncated as desired. Furthermore, the end members may be secured to the body member by means of bellows-like members in place of the sliding members that are illustrated in the figure.

What is claimed is:

1. An apparatus for reducing pressure surges in a conduit for transporting liquids which comprises a cylindrical body member disposed within the conduit and supported therefrom to define an annular passageway between the walls of the conduit and the walls of the body member, at least two longitudinally juxtaposed chambers within said body member, each said chamber being adapted to contain a body of compressible fluid, at least one throttling fluid passageway interconnecting said chamber, a conical end member disposed at each end of said body member and longitudinally movable relative to said body member, sealing means interposed between each said conical member and said body member to provide a fluid-tight relation therebetween, each said conical member being adapted to compress and expand the compressible fluid within its corresponding chamber in response to pressure surges within said conduit thereby forcing fluid through said throttling fluid passageway in response thereto.

2. An apparatus as defined in claim 1 in which the body member is disposed within a radially expanded portion of the conduit and the cross-sectional area of the annular passageway is from 2 to 5 times the cross-sectional area of the non-expanded portion of the conduit.

3. An apparatus as defined in claim 1 in which the apparatus is disposed within a radially expanded portion of the conduit and the cross-sectional area of the annular passageway between the body member and the expanded portion is about 3 times the cross sectional area of the non-expanded portion of the conduit.

4. An apparatus for reducing pressure surges within a conduit which is adapted for the transportation of liquids which comprises a conduit section interposed along the conduit and having a larger diameter than the conduit, a cylindrical body member disposed within the conduit section and defining an annular passageway therebetween, the longitudinal axis of said body member being substantially in longitudinal alignment with the axis of the conduit section, two longitudinally juxtaposed chambers disposed within said body member and arranged to contain a compressible fluid, a conical member disposed at each end of said body member, sealing means interposed between each conical member and said body member maintaining a fluid-tight relationship therebetween, each conical member being longitudinally moveable relative to said body member, each conical member being adapted to compress and expand the compressible fluid within said body member in response to pressure surges within said conduit section, and at least one small passageway adapted to provide fluid flow between said chambers.

References Cited in the file of this patent
UNITED STATES PATENTS

| | | |
|---|---|---|
| 1,339,114 | Larner | May 4, 1920 |
| 2,690,762 | Adams | Oct. 5, 1954 |
| 2,729,234 | Stevenson | Jan. 3, 1956 |

FOREIGN PATENTS

| | | |
|---|---|---|
| 950,234 | France | Sept. 21, 1946 |
| 858,171 | Germany | July 8, 1949 |